US011693906B2

(12) United States Patent
Balasubrahmanian et al.

(10) Patent No.: US 11,693,906 B2
(45) Date of Patent: Jul. 4, 2023

(54) METHOD AND SYSTEM FOR USING ACCESS PATTERNS TO SUGGEST OR SORT OBJECTS

(71) Applicant: Oracle International Corporation, Redwood Shores, CA (US)

(72) Inventors: Kaarthik Balasubrahmanian, Belmont, CA (US); Steffi Dsouza, Belmont, CA (US); Donald Creig Humes, Yorktown, VA (US); Hamid Bahadori, Atherton, CA (US); Sridhar Tadepalli, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 686 days.

(21) Appl. No.: 15/971,062

(22) Filed: May 4, 2018

(65) Prior Publication Data
US 2018/0357229 A1 Dec. 13, 2018

Related U.S. Application Data

(60) Provisional application No. 62/519,076, filed on Jun. 13, 2017, provisional application No. 62/519,080, filed on Jun. 13, 2017.

(51) Int. Cl.
G06F 16/93 (2019.01)
G06F 3/04817 (2022.01)
(Continued)

(52) U.S. Cl.
CPC ............ *G06F 16/94* (2019.01); *G06F 3/0482* (2013.01); *G06F 3/04817* (2013.01);
(Continued)

(58) Field of Classification Search
CPC .......... G06F 16/94; G06F 9/451; G06F 9/453; G06F 16/447; G06F 3/04817; G06F 3/0482; G06F 3/04842
See application file for complete search history.

(56) References Cited

U.S. PATENT DOCUMENTS 5,809,509 A 9/1998 Blackman et al.
6,804,627 B1 10/2004 Marokhovsky et al.
(Continued)

Primary Examiner — Apu M Mofiz
Assistant Examiner — Husam Turki Samara
(74) Attorney, Agent, or Firm — Invoke

(57) ABSTRACT

Some embodiments improve object accessibility within a user interface based on a set of access patterns associated with the object. Improving accessibility for an object may include positioning a shortcut for the object to allow for quick access to the object. Another example includes executing commands to traverse a user interface, without receiving user input, to display a screen for accessing the object. Another example includes establishing a connection for accessing the object prior to receiving a request to access the object.

A trigger for improving the accessibility for the object may be programmed based on a set of conditions detected when the object was previously accessed. Thereafter, detection of the same set of conditions triggers an improvement in the accessibility for the object. When the set of conditions corresponding to the trigger is no longer detected, the system may revert back to the default accessibility for the object.

24 Claims, 9 Drawing Sheets

(51) Int. Cl.
*G06F 9/451* (2018.01)
*G06F 3/04842* (2022.01)
*G06F 16/44* (2019.01)
*G06F 3/0482* (2013.01)

(52) U.S. Cl.
CPC .......... *G06F 3/04842* (2013.01); *G06F 9/451* (2018.02); *G06F 9/453* (2018.02); *G06F 16/447* (2019.01)

(56) References Cited

U.S. PATENT DOCUMENTS

| | | | |
|---|---|---|---|
| 7,844,601 | B2 | 11/2010 | Seeds |
| 8,159,961 | B1 | 4/2012 | Rai et al. |
| 8,682,925 | B1 | 3/2014 | Marquardt et al. |
| 8,706,717 | B2 | 4/2014 | Rajasekhar |
| 9,547,693 | B1 | 1/2017 | Sheasby et al. |
| 2006/0225000 | A1 | 10/2006 | Albrecht et al. |
| 2007/0016614 | A1 | 1/2007 | Novy |
| 2007/0100967 | A1 | 5/2007 | Smith et al. |
| 2008/0005685 | A1* | 1/2008 | Drews ........................ G06F 9/00 |
| 2008/0243799 | A1 | 10/2008 | Rozich et al. |
| 2009/0276412 | A1* | 11/2009 | Anderson ............... G06Q 30/02 |
| 2015/0112985 | A1 | 4/2015 | Roggero et al. |
| 2015/0309874 | A1 | 10/2015 | Liang et al. |
| 2015/0331751 | A1 | 11/2015 | Saeki |
| 2015/0347508 | A1 | 12/2015 | Lang et al. |
| 2016/0098409 | A1 | 4/2016 | Burke et al. |
| 2016/0224641 | A1 | 8/2016 | Elias et al. |
| 2016/0335117 | A1 | 11/2016 | Kogan et al. |
| 2017/0124146 | A1 | 5/2017 | Lereya et al. |
| 2017/0277396 | A1* | 9/2017 | Chung .................. G06F 3/0482 |
| 2017/0357237 | A1 | 12/2017 | Kim |
| 2018/0059985 | A1* | 3/2018 | Raghunath ............ G06F 16/134 |
| 2018/0067620 | A1* | 3/2018 | Adler .................... G06Q 10/047 |
| 2018/0089306 | A1 | 3/2018 | Pal et al. |
| 2018/0357237 | A1 | 12/2018 | Balasubrahmanian et al. |
| 2018/0357304 | A1 | 12/2018 | Balasubrahmanian et al. |

* cited by examiner

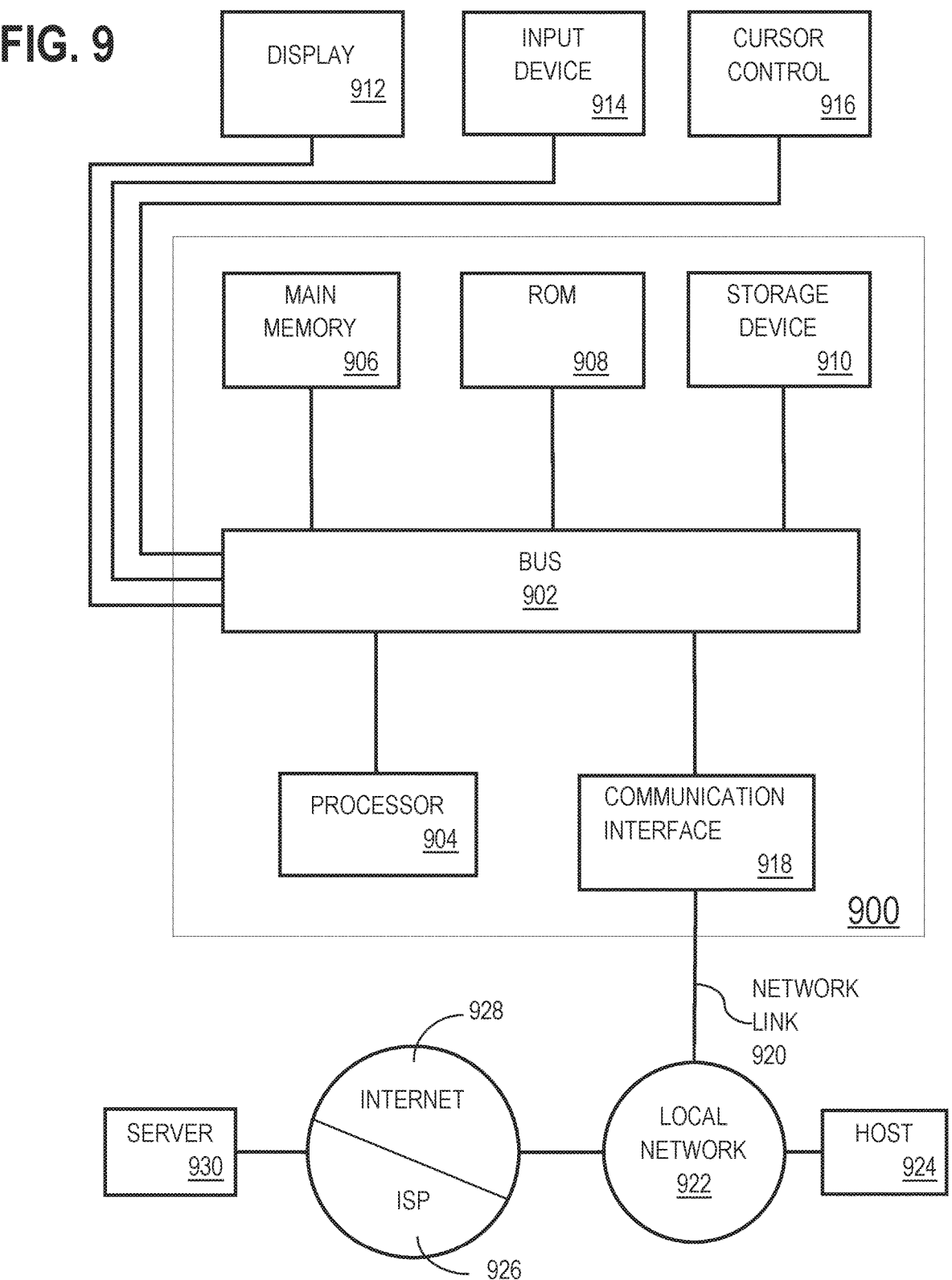

METHOD AND SYSTEM FOR USING ACCESS PATTERNS TO SUGGEST OR SORT OBJECTS

BENEFIT CLAIMS

This application claims the benefit of U.S. Provisional Patent Application 62/519,076, filed Jun. 13, 2017, and U.S. Provisional Patent Application 62/519,080, filed Jun. 13, 2017; both of which are hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to selecting and presenting objects to a user. In particular, the present disclosure relates to selecting and presenting objects to a user based on current conditions and prior access patterns.

BACKGROUND

A client device may receive updates from or submit updates to a backend server. The updates, received or submitted by a client device, include updates to data.

Client devices may be operated in an online mode and an offline mode. An online mode is a mode in which a client device may communicate with a backend server via a network. An offline mode is a mode in which the client device is unable to communicate with a backend server via a network. When operating in an online mode, a client device may receive updates from and submit updates to a backend sever. When operating in an offline mode, a client device is unable to receive updates from or submit updates to a backend server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Some embodiments improve object accessibility within a user interface based on a set of access patterns associated with the object. Accessibility for an object refers to an amount of time, effort, or operations required to access an object via the user interface. Improving accessibility for an object may include, for example, temporarily positioning a shortcut for the object to allow for quick access to the object. Another example includes executing commands to traverse a user interface, without receiving user input, to display a screen for accessing the object. Another example includes establishing a connection necessary for accessing the object prior to receiving a request to access the object.

An object access history may identify a set of conditions that were detected when the object was previously accessed. A trigger for improving the accessibility for the object may be programmed based on the set of conditions. Thereafter, detection of the same set of conditions triggers an improvement in the accessibility for the object. When the set of conditions corresponding to the trigger is no longer detected, the system may revert back to the default accessibility for the object.

This Specification may include, and the claims may recite, some embodiments beyond those that are described in this General Overview section.

2. ARCHITECTURAL OVERVIEW

Figure 1:
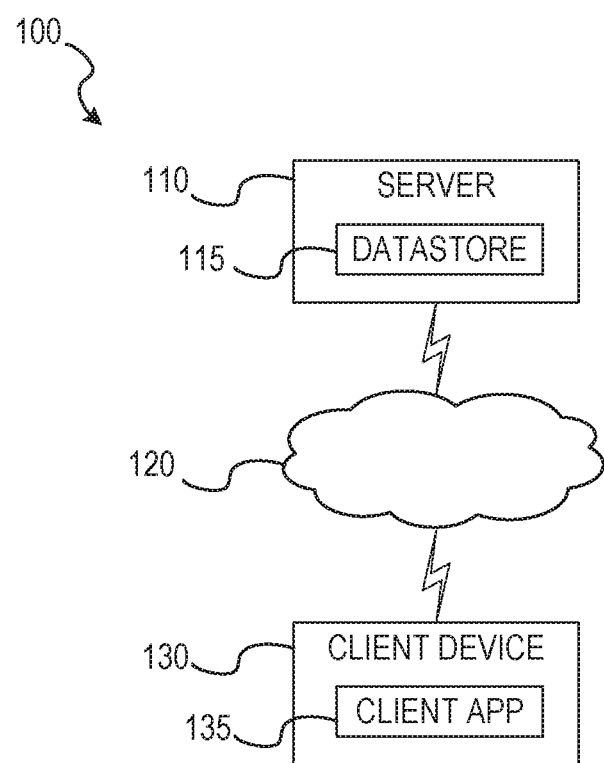
FIG. 1 shows a block diagram that illustrates a client-server computing system that operates over a network in accordance with one or more embodiments.

FIG. 1 shows a block diagram that illustrates a client-server computing system 100 that operates over a network 120 in accordance with one or more embodiments. The client-server computing system 100 may include a server 110 and a client device 130 communicatively coupled via the network 120. Each of the server 110 and the client device 130 may include a computing processor and associated memory and communications circuitry.

The network 120 may include a local area network (LAN), wide area network (WAN), Ethernet network, Token Ring network, asynchronous transfer mode (ATM) network, Wi-Fi network, the Internet, cellular telephone network, Enhanced Data rates for GSM Evolution (EDGE) network, long-term evolution (LTE) network, Worldwide Interoperability for Microwave Access (WiMAX) network, or other computing communications networks. The server 110 may include a datastore 115 that stores data accessible by the client device 130 via the network 120. The client device 130 may include a client application 135 (e.g., software application) that receives data from or accesses data stored in the datastore 115.

In an embodiment, the client device 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and a client device.

In one or more embodiments, the datastore 115 is any type of storage unit and/or device (e.g., a file system, database, collection of tables, or any other storage mechanism) for storing data. Further, the datastore 115 may include multiple different storage units and/or devices. The multiple different storage units and/or devices may or may not be of the same type or located at the same physical site. Alternatively or additionally, the datastore 115 may be implemented or executed on a computing system separate from the server 110. The datastore 115 may be communicatively coupled to the server 110 or the client device 130 via a direct connection or via the network 120.

The client application 135 may access data objects stored in the datastore 115 using a set of hypertext transfer protocol (HTTP) uniform resource identifiers (URIs), e.g., uniform resource locators (URL) used in conjunction with an HTTP request. HTTP may be used as a request-response protocol between the client device 130 and the server 110 to facilitate the transfer and management of data between the client application 135 and the datastore 115.

The server 110 may provide a representational state transfer (REST) service for servicing REST requests received from the client application 135. A REST request is a type of stateless HTTP request and may be transmitted to the server 110 by the client device 130. REST requests are subsets of HTTP requests. The REST request may use a set of uniform and predefined stateless operations. State may not be kept from request to request when the REST request is used. The server 110 may provide a description of the server 110 to the client application 135 as a REST server through a well-defined URL. Through this well-defined URL, the server 110 may provide a mechanism for the client application 135 to efficiently retrieve data from and upload data to the datastore 115.

In one or more embodiments, a user interface refers to hardware and/or software configured to facilitate communications between a user and the client device 130. The user interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface is specified in one or more other languages, such as Java, C, or C++.

In one or more embodiments, the client-server computing system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. AN ADAPTIVE POLYMORPHIC DATA MODEL

Figure 2:
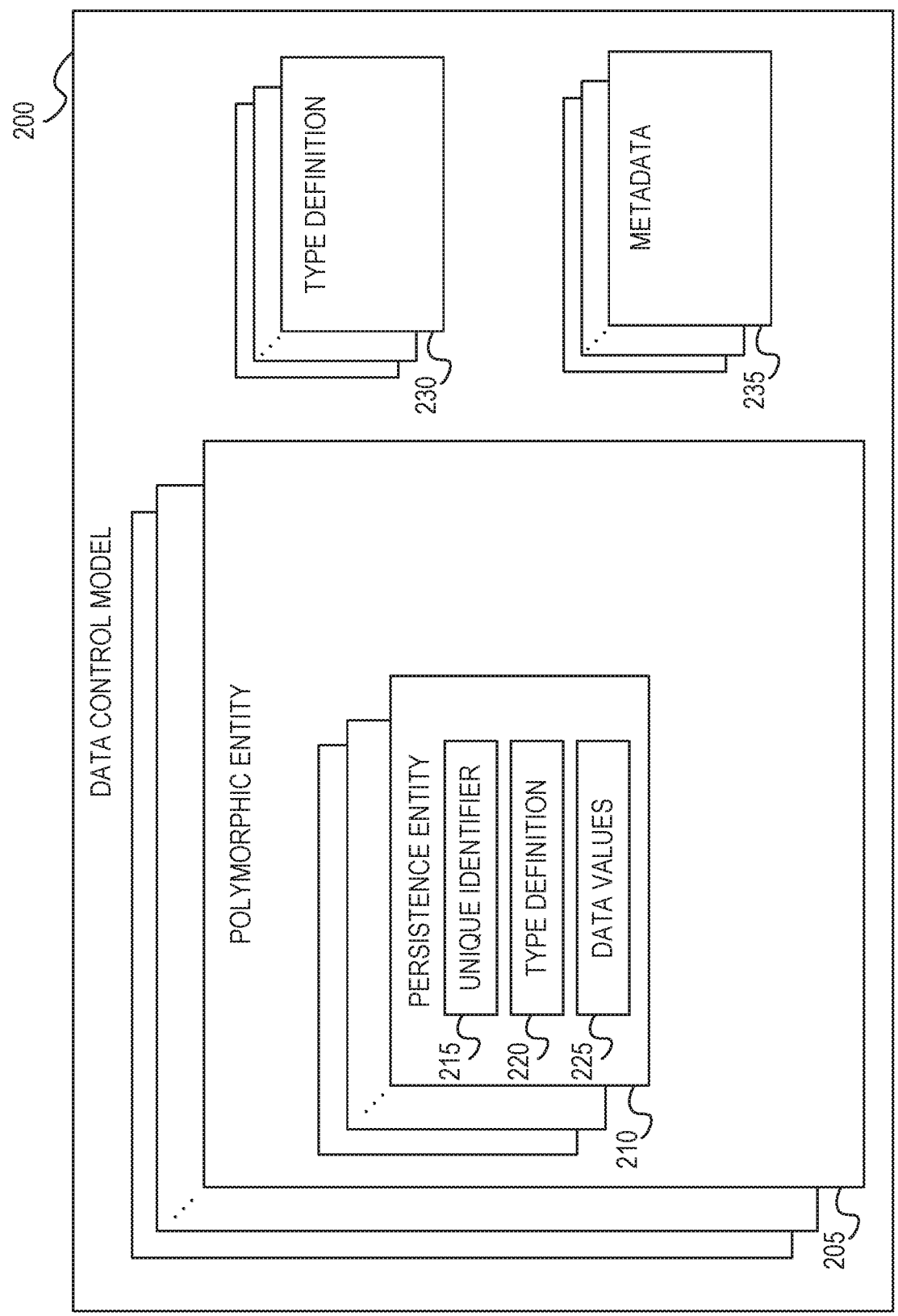
FIG. 2 shows a block diagram that illustrates components of a data control model in accordance with one or more embodiments.

FIG. 2 shows a block diagram that illustrates components of a data control model 200 in accordance with one or more embodiments. The data control model 200 may be an embodiment of an adaptive polymorphic data model. The data control model 200 may describe a database schema used by the client application 135. The server 110 may provide elements of the data control model 200 to the client application 135 from the datastore 115. The functionality and/or features of the client application 135 may be controlled as a function of the data control model 200. Thus, the client application 135 may provide different functionalities when provided with different elements of the data control model 200. Updates to the data control model 200 may be used to update the client application 135's functionality without updating the client application 135's executable code. Thus, new functionality may be added to the existing client application 135 by transmitting new elements of the data control model 200 to the existing client application 135 from the server 110.

In an example, a single client application 135 may be made available to any customer of a software provider via a central application download portal on a network. Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

For example, Company A may have a dedicated instance of the server 110 that only employees of Company A have access to via a set of client devices 130 that are issued to the employees of Company A by Company A. All of the client devices 130 used by employees of Company A may download the client application 135 from a publicly available application portal. In addition, Company B may have a dedicated instance of the server 110 that only employees of Company B have access to. The employees of Company B may access the server 110 via a set of client devices 130 that are issued by Company B to the employees of Company B. All of the client devices 130 used by employees of Company B may download the client application 135 from the same publicly available application portal as the employees of Company A. Company A's instance of the server 110 may download a data control model 200 customized for Company A to the client applications 135 on Company A's client devices 130. Company B's instance of the server 110 may download a data control model 200 customized for Company B to the client applications 135 on Company B's client devices 130. As a result, the client applications 135 for Company A's employees may provide different functionality than the client applications 135 for Company B's employees, even though the executable client application 135 downloaded from the publicly available application portal is the same for all of Company A's and all of Company B's client devices 130.

The data control model 200 may include one or more object type definitions 230. Each object type definition 230 may define an object type. The object type definition 230 may specify attributes of the object type. Examples of attributes may include sales order, delivery date, quantity, revenue, etc. The object type definition 230 may also specify the data format of an attribute, e.g., text string, length of text string, character, integer, signed integer, unsigned integer, floating point, double precision floating point, character or integer array, array dimensions, etc. The object type definition 230 may also specify default values for each attribute of the object type. The object type definition 230 may also specify which fields are mandatory for inclusion in each view of the defined object type, and which are mandatory for inclusion in a full canonical view of the defined object type. For example, a delivery date may be a mandatory field for a sales order data object type. The object type definition 230 may also specify which fields may be changed by the client application 135 and which fields may not be changed. For example, revenue may be a field for a sales order data object type that cannot be changed by the client application 135. The object type definition 230 may also specify the functions that the client application 135 is to use to communicate with the server 110 with regard to the object type. Examples of such functions may include fetch, update, delete, etc. The functions specified in the object type definition 230 include information to be used by the client application 135 to build URL's for communicating with the server 110 regarding the object defined by the respective object type definition 230. Such communications may include transmitting values of data fields of an object to the datastore 115 and updating a value of a data field of an object at the datastore 115. A URL may be specified to update the value of a data field of the object at the datastore 115.

The data control model 200 may also include one or more metadata modules 235. The metadata modules 235 may be embodied as data files or data objects. Each metadata module 235 may identify fields of an object type defined by the respective object type definition 230. For example, numerous different metadata modules 235 may identify a different set of fields of a same object type defined by the respective object type definition 230. Each of the different metadata modules 235 that correspond to the same object may define a different view or shape of the object type. The server 110 may store a complete or full canonical representation of the object type in the datastore 115. The client application 135 may download different subsets of the full set of fields of the object type stored in the datastore 115 to work with according to the metadata modules 235. Downloading a partial object from the datastore 115 may provide a savings in communications bandwidth over the network 120 and a savings in memory usage in the client device 130. The alternative of downloading the full canonical representation of the object type each time the object type is operated upon, regardless of what portions of the object type are to be operated upon, may be inefficient.

As an example, the client application 135 may use a metadata module 235 that represents a small subset of the fields of a data object type in order to download a list of data objects from the datastore 115. The client application 135 may use an HTTP request sent from the client device 130 to the server 110 to access the list of data objects in the datastore 115 that have a field value for a given field that matches a search parameter specified by the client application 135. The client application 135 may specify an object sub-type defined in the metadata module 235 so that the desired subsets of the fields of the data objects are downloaded, and not the complete or full canonical representations of the data objects. Thus, the sub-types defined in the metadata module 235 facilitate the client application 135 downloading a partial object from the datastore 115 rather than the full canonical object.

For example, a data object type may be a sales order. The client application 135 may download a list of sales orders for a specified customer, or a specified sales person, or a specified period of time, etc. The client application 135 may present the list of sales orders in a user interface. A user may select one or more of the presented list of sales orders to see more data regarding the sales orders or to perform operations upon the sales orders. In response to the user selection, the client application 135 may use a different metadata module 235 that represents a larger subset of the fields of the sales order data object type to download additional details regarding the selected one or more of the presented list of sales orders. The sales order data object type defined in a respective object type definition 230 may have a number of different associated metadata modules 235. Each of the metadata modules 235 may represent a different level of detail of the sales order data object type. The levels of detail may range from a minimal list view to a full canonical view that includes all the data fields of the sales order data object type.

In addition to specifying different views of objects defined in the object type definitions 230, the metadata modules 235 may also specify how the objects behave, interact with one another, interact with a user interface of the client application 135, and interact with the server 110. The metadata modules 235 may specify a layout of an object and offsets associated with each field of an object.

The data control model 200 may include one or more polymorphic entities 205. Each polymorphic entity 205 may define a different overall functionality for the data control model 200. When the client application 135 operates according to one polymorphic entity 205, the client application 135 may provide different features or functionality than when the client application 135 operates according to a different polymorphic entity 205.

Each polymorphic entity 205 may include one or more persistence entities 210. The persistence entities 210 of one instance of the polymorphic entity 205 may be different than the persistence entities 210 of a different instance of the polymorphic entity 205. Each instance of a persistence entity 210 may represent an instance of a data object as defined in a corresponding object type definition 230.

The persistence entity 210 may be an abstract representation of a data object. The persistence entity 210 may include a unique identifier 215 that uniquely identifies each instance of the persistence entity 210 within a specific polymorphic entity 205. The persistence entity 210 may also include an object type definition 220 that defines the object type represented by the persistence entity 210. The object type definition 220 may be an embodiment of a corresponding object type definition 230. The persistence entity 210 may also include a plurality of data values 225, each of which may be associated with a data field name as defined in the object type definition 220.

The persistence entity 210 may include functions defined by the object type definition 220 that operate on the data values 225 and interact with the datastore 115 with reference to a data object type as defined by the object type definition 220. Executable code included in the client application 135 that implements the persistence entity 210 may have no built-in information regarding the data objects represented by the object type definition 220. The executable code included in the client application 135 may provide functionality according to data included in the object type definition 220. In an embodiment, the persistence entity 210 may be implemented by Java code in the client application 135, and the object type definition 220 may be specified according to a JavaScript Object Notation (JSON) representation provided by the datastore 115. In various embodiments, other programming languages and database formats may be used to implement the persistence entities 210 in the client application 135. The Java code for the persistence entity 210 may be provided with the client application 135 at design time, while the JSON representation of the object type definition 220 may be provided via the datastore 115 at run time.

For example, an instance of a persistence entity 210 may be an object that is an instance of a sales order datatype that is defined according to a class that includes methods for operating on the sales order datatype. The class may be defined by the object type definition 230. According to the class definition, the persistence entity 210 may be able to build HTTP requests as appropriate to work with sales order data objects stored in the datastore 115, including fetching the sales order data objects, updating the sales order data objects, etc. Functions provided by the persistence entity 210 that operate on data objects stored in the datastore 115 may be defined generally to operate upon any type of data objects stored in the datastore 115. The functions provided by the persistence entity 210 may be called by methods provided in the class by which the persistence entity 210 is defined according to the object type definition 220. For example, rather than a hardcoded function named GetRevenue(<object identifier>) that is defined to only operate on a Revenue object, the executable code of the client application 135 may include a hardcoded function named Get( ) that may be called by a method of the class corresponding to a sales order data type persistence entity 210 on a field named Revenue as Get(Revenue, <object identifier>), where <object identifier> is the unique identifier 215 of the corresponding persistence entity 210.

In an example, when the client application 135 fetches a list of sales order data objects from the datastore 115, each sales order object returned may be represented by a separately defined instance of the persistence entity 210. The sales order data objects returned in the list may be represented as sub-types of the full canonical sales order data type stored in the datastore 115 according to a metadata module 235 corresponding to a list of the sales order data object type. A user may select one of the sales order data objects in the list to request the associated Revenue field value. The Revenue field may not be included in the sub-type of the sales order data type according to the metadata module 235 corresponding to the list. A Get(Revenue, <identifier>) function may be executed by the persistence entity 210 corresponding to the selected sales order data object. The Get function may look up the Revenue field in the persistence entity's object type definition 220 to determine what kind of data the Revenue field contains and look up the value for the field in the data values 225. If the value is not included in the data values 225, the Get function may issue an HTTP request to the datastore 115 according to a metadata module 235 that includes the field Revenue for the sales order data object type. After receiving the Revenue data field, and any other data fields defined by the metadata module 235 used by the Get function, the Get function may perform processing on the Revenue data value according to the class definition of the method corresponding to the Get function as specified by the object type definition 220. The persistence entity 210 may then present the Revenue data value returned by the Get function to the user via a user interface of the client application 135.

Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

In an embodiment, a particular customer of a software provider that provides the client application 135 to the particular customer may desire to update the functionality of the client application 135 used by the particular customer or under the particular customer's control. The updated functionality may include new data object type definitions 230 (e.g., for a new regional warehouse data object), new metadata modules 235, updates to either or both of existing data object type definitions 230 and metadata modules 235, etc. The particular customer may use a software tool to update the data control model 200 at the particular customer's server 110. The particular customer may transmit the updated data control model 200 to the particular customer's one or more instances of the particular customer's client application 135 on various client devices 130 under the particular customer's control. The particular customer's update of the particular customer's client application 135 on various client devices 130 under the particular customer's control may not affect instances of the client application 135 provided by the software provider to other customers of the software provider. All customers of the software provider may install and use a same executable client application 135. The particular customer may update the data control model 200 used by the particular customer's instances of the client application 135 without affecting any other instances of the client application 135.

In an embodiment, a salesperson may use the client application 135 to display a list of sales opportunities. Each of the sales opportunities may be represented by an object type Opportunities in the data control model 200 of the client application 135. In response to a request from the salesperson, the client application 135 may display a list of values of data fields from the Opportunities objects that meet the salesperson's criteria. The client application 135 may determine, based on the configuration of the client application 135, that only the customer name and the customer phone number are displayed in a list view of opportunities. The client application 135 may analyze a metadata module 235 corresponding to the object type Opportunity. The client application 135 may determine that the metadata module 235 corresponding to the object type Opportunity includes the to-be-displayed fields, customer name and customer phone number. The client application 135 may retrieve values for fields identified in the corresponding metadata module 235 from the datastore 115. As the fields to-be-displayed are included in the corresponding metadata module 235, the client application 135 may retrieve values for the customer name and the customer phone number from objects of type Opportunity stored in the datastore 115. The client application 135 may display, in a list view, the retrieved information for different opportunities.

In addition to storing the values for customer name and customer number, the datastore 115 may also store values for a field customer budget in the object type Opportunity. However, the client application 135 may not obtain a copy of the values corresponding to customer budget as customer budget is not identified in corresponding metadata module 235 used by the client application 135.

In an embodiment, the client application 135 may receive a user request for a value of a field of an object that is not included in the corresponding metadata module 235. The client application 135 may search the metadata modules 235 for another corresponding metadata module 235 that does include the requested field for the specified object type. The client application 135 may then download the object from the datastore 115 according to the other corresponding metadata module 235 that does include the requested field. The client application 135 may modify the locally stored partial copy of the object, previously retrieved from the server, to include the fields and values obtained from the datastore 115 corresponding to the other corresponding metadata module 235 that does include the requested field for the specified object type.

Continuing the above example, the client application 135 may receive a selection of a particular opportunity from the salesman when the client application 135 is displaying opportunities in the list view. The client application 135 may be configured to show a detailed view of an opportunity in response to receiving a selection of that opportunity. The client application 135 may determine that the detailed view of an opportunity includes a customer name, a customer phone number, and a customer budget. The client application 135, based on an analysis of the corresponding metadata module 235, may determine that the corresponding metadata module 235 identifies the fields customer name and customer phone number. The client application 135 may further determine that the corresponding metadata module 235 does not identify the field customer budget. Since the corresponding metadata module 235 does not identify the field customer budget, any version of an object, corresponding to the particular opportunity, which is stored by the client application according to the corresponding metadata module 235 may be determined to not include values for the field customer budget. The client application 135 may identify a different metadata module 235 in the data control model 200 corresponding to the object type Opportunity that does include the desired field customer budget. The client application 135 may then request, from the datastore 115 on the server 110, values corresponding to the fields identified in the different metadata module 235 that does include the field customer budget. Specifically, the client application 135 may request the object of type Opportunity which corresponds to the particular opportunity selected by the salesman. In response to transmitting the request, the client application 135 may receive an object of type Opportunity and corresponding to the particular opportunity selected by the salesman. The object may include values for customer name, customer number, and customer budget which are all now identified in the different metadata module 235 maintained by the client application 135 that is now selected to define the view of the particular object. Alternatively, the object received from the datastore 115 may not include values for the customer name and customer number if no change has been made to the values since the last time the values were received by the client application 135. The client application 135 may replace or overwrite any stored prior version of the object corresponding to the particular opportunity. The client application 135 may store a new version of the object, corresponding to the particular opportunity, and including customer name, customer phone number, and customer budget. The client application 135 may display a detailed view of the particular opportunity selected by the salesman. The detailed view, displayed by the client application 135, may include the customer name, the customer number, and the customer budget.

In an embodiment, an application on the server 110 may receive a request to create a new integer field of type Commission for an object of the type Opportunity stored in the datastore 115. The field type Commission may not currently be identified as a field in any object type definition 230 or metadata module 235 maintained by the client application 135 or maintained by the server 110. The server 110 may update the object type definition 230 corresponding to the object type Opportunity and one or more corresponding metadata modules 235 maintained by the client application 135. Specifically, the updates to the object type Opportunity and one or more corresponding metadata modules 235 include a new integer field of type Commission. The datastore 115 and the client application 135 may store values for the field of type Commission to reflect the addition of the new field of type Commission. The client application 135 may also retrieve and display values corresponding to the field Commission on a user interface.

In an embodiment, the server 110 may receive a request to generate a new type of an object that is different than the types of any objects stored in the datastore 115 and/or the client application 135. Responsive to the request to generate an object of a new type, the server 110 may (a) generate a new object type definition 230 and (b) generate one or more new metadata modules 235 corresponding to the new object type. The object type definition 230 may include one or more data fields to be included in the new type of object, and the one or more metadata modules 235 may specify different subsets of the one or more data fields to be included in the new type of object. The server 110 may synchronize the new object type definition 230 and the new one or more metadata modules 235 with the client application 135 by updating the data control model of the client application 135. Accordingly, the server 110 and the client application 135 may use the object type definitions 230 and the metadata modules 235 to define new object types. The server 110 may add a new object type to a collection of object types defined by the server 110 and used by the client application 135.

Continuing the above example, the server 110 may receive a request to create a new object of type NetworkingEvent. The request may further specify three fields Date, Time, and Location as fields of the object of the type NetworkingEvent. Neither the client application 135 nor the server 110 may include an object type definition 230 or metadata module 235 defining any object of type NetworkingEvent. Responsive to receiving the request, the server 110 may generate an object type definition 230 and one or more metadata modules 235 corresponding to the object type NetworkingEvent. The object type definition 230 and one or more metadata modules 235 corresponding to the object type NetworkingEvent may identify at least three fields Date, Time, and Location. The server 110 may transmit the object type definition 230 and one or more metadata modules 235 to the client application 135 to provide a definition the object type NetworkingEvent. The client application 135 may also generate objects of type NetworkingEvent and transmit the objects to the server 110 for synchronization.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

4.1 Modifying a Polymorphic Data Model

Figure 3:
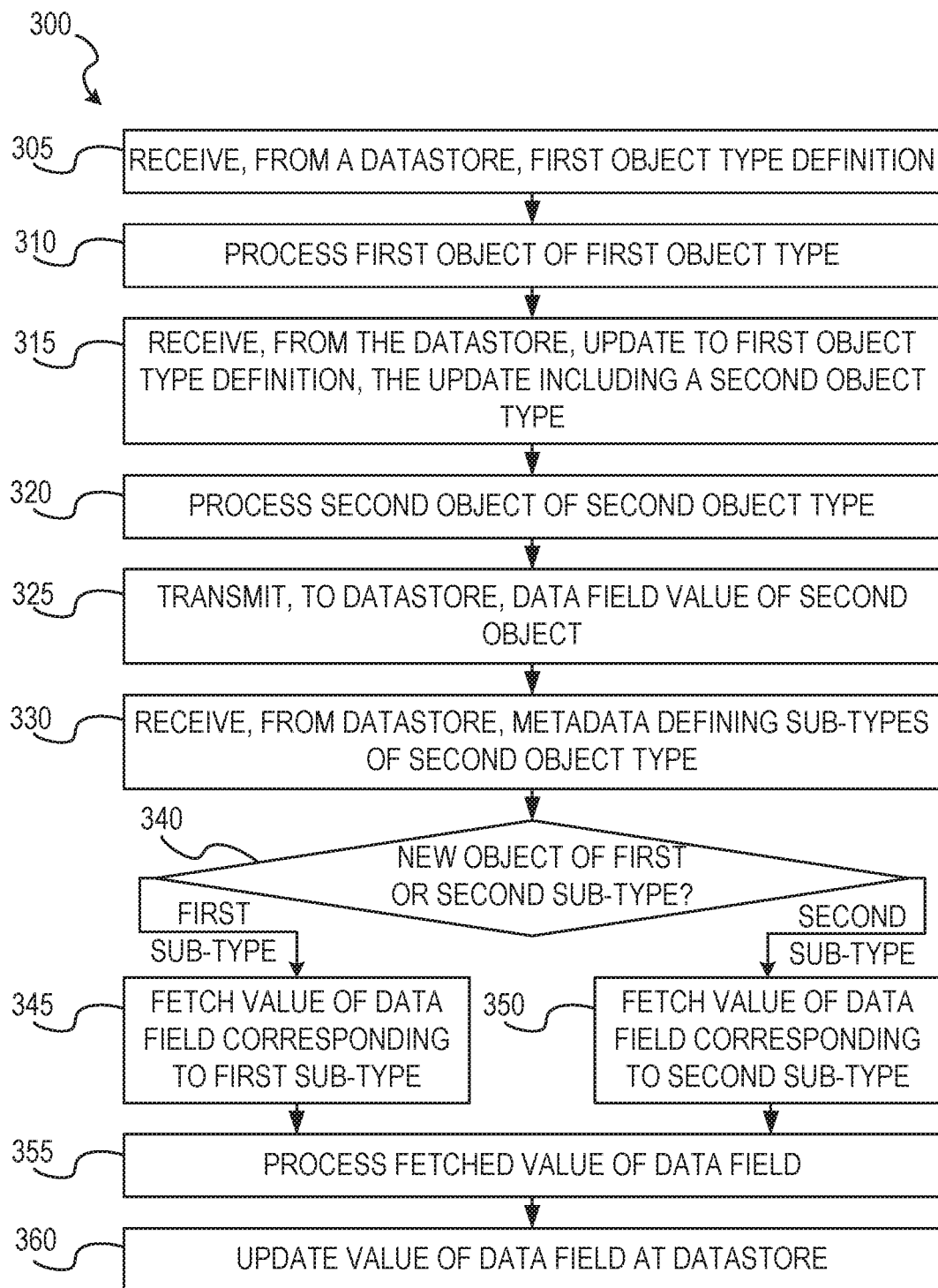
FIG. 3 shows a block diagram that illustrates an example set of operations for updating an object type definition in accordance with one or more embodiments.

FIG. 3 shows a block diagram that illustrates an example set of operations 300 for updating an object type definition in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an operation 305, a client application 135 may receive a first object type definition 230 from a datastore 115. The first object type definition 230 may be received by a client device 130 on which the client application 135 executes over a network 120 from a server 110 that hosts the datastore 115. The first object type definition 230 may define a first object type to be used in a data control model 200 that controls the functionality of the client application 135. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field.

In an operation 310, a first object of the first object type may be processed according to the received first object type definition 230. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 315, the client application 135 may receive an update to the first object type definition 230 from the datastore 115. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 320, a second object of the second object type may be processed according to the received second object type definition 230. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 325, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may update the value of the Customer Budget stored in the Opportunity object in the datastore 115. The client application 135 may transmit a value of the Customer Budget when the second object type is an Opportunity with an updated list of data fields compared to the first object type.

In an operation 330, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130. When only the Customer Name field is needed to be presented in the user interface of the client application 135, the full canonical representation of the Opportunity objects may not be needed, and the list sub-type may be more efficient. Another method for the Opportunity object type may download the full canonical representation of a selected Opportunity object according to the full canonical sub-type metadata module 235. When one Opportunity object in the list of Opportunity objects is selected for viewing and/or editing all the data fields of the selected Opportunity object, the full canonical representation of the Opportunity objects may be needed, and the list sub-type may be insufficient.

In an operation 340, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 345, if the new object is determined to correspond to the first sub-type of the second object type definition 230 in operation 340, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 350, if the new object is determined to correspond to the second sub-type of the second object type definition 230 in operation 340, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 355, the client application 135 may process the value of the data field fetched in either of operations 345 or 350. For example, the client application 135 may display the value of the fetched data field in the user interface of the client application 135. The client application 135 may perform a mathematical computation on the value of the fetched data field and display the results of the mathematical computation in the user interface of the client application 135.

In an operation 360, the client application 135 may cause a value of the data field processed in operation 355 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 345 and 350 according to the results of the processing of the fetched value of the data field in operation 355.

Figure 4:
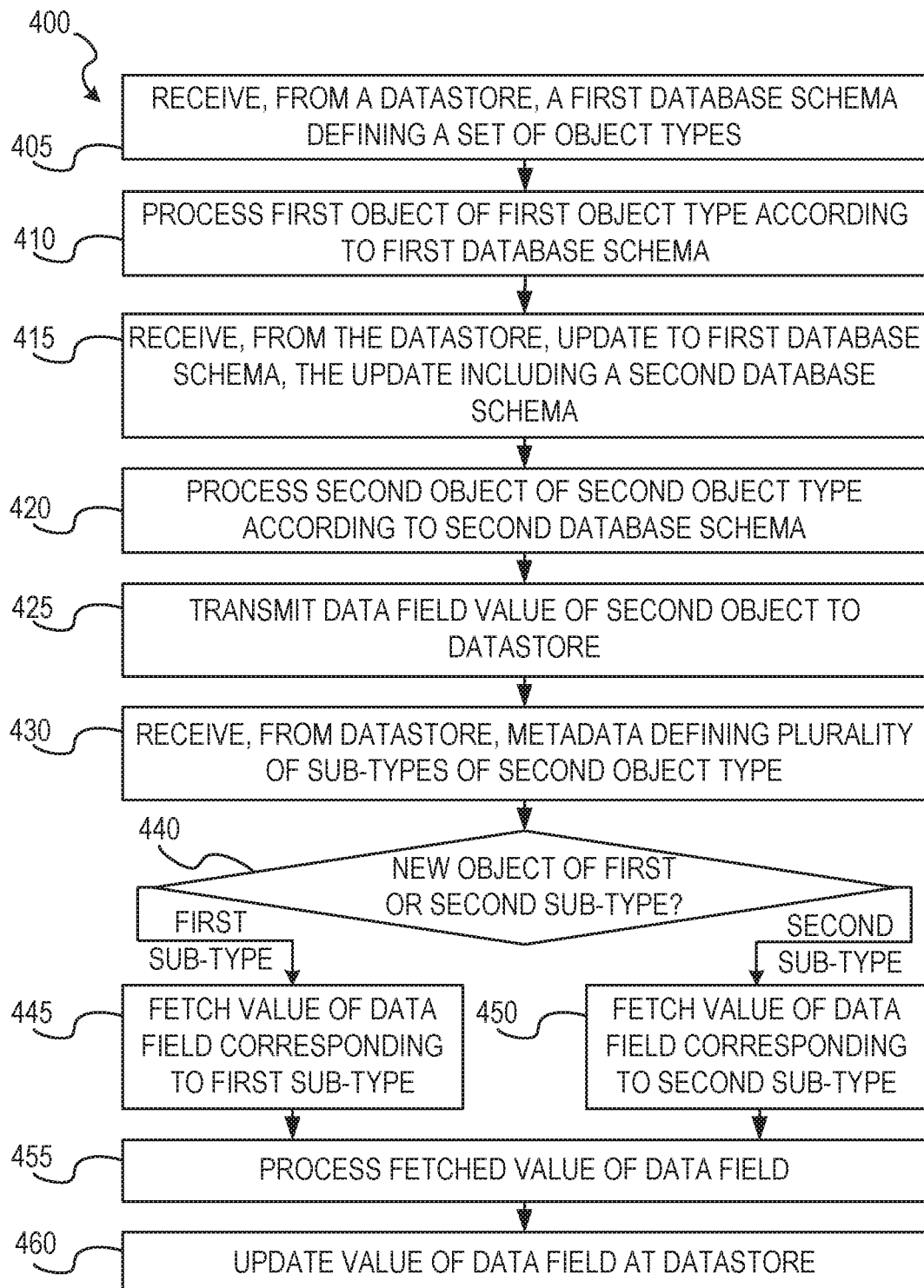
FIG. 4 shows a block diagram that illustrates an example set of operations for updating an object type definition in accordance with one or more embodiments.

FIG. 4 shows a block diagram that illustrates an example set of operations 400 for updating an object type definition in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an operation 405, a client application 135 may receive a first database schema, e.g., a data control model 200 that controls the functionality of the client application 135, from a datastore 115. The first database schema may be received by a client device 130 on which the client application 135 executes over a network 120 from a server 110 that hosts the datastore 115. The first database schema may include a first object type definition 230 that defines a first object type. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field. The first database schema may also include one or more metadata modules 235 that each define a view of the first object type defined by the first object type definition 230. Each of the one or more metadata modules 235 may specify a different subset of data fields included in the full canonical representation of the first object type to be included in the respective view. As an example, one view defined by one of the metadata modules 235 may specify only the Customer Name field be included from the various fields specified by the full canonical Opportunity object type. Another view defined by another of the metadata modules 235 may specify that both the Customer Name field and a Customer Phone Number field be included from the various fields specified by the full canonical Opportunity object type.

In an operation 410, a first object of the first object type may be processed according to the received first database schema. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the first database schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 415, the client application 135 may receive an update to the first database schema from the datastore 115. The update to the first database schema may include a second database schema different from the first database schema. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 420, a second object of the second object type may be processed according to the received second database schema. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 425, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may transmit a value of the Customer Budget when the second object type is an Opportunity with an updated list of data fields compared to the first object type, and thereby update the value of the Customer Budget stored in the Opportunity object in the datastore 115.

In an operation 430, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130 when only the Customer Name field is needed to be presented in the user interface of the client application 135. Another method for the Opportunity object type may download the full canonical representation of a selected Opportunity object according to the full canonical sub-type metadata module 235 when one Opportunity object in the list of Opportunity objects is selected for viewing and/or editing all the data fields of the selected Opportunity object.

In an operation 440, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 445, if the new object is determined to correspond to the first sub-type of the second object type definition 230 in operation 440, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 450, if the new object is determined to correspond to the second sub-type of the second object type definition 230 in operation 440, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 455, the client application 135 may process the value of the data field fetched in either of operations 445 or 450. For example, the client application 135 may display the value of the fetched data field in the user interface of the client application 135, or the client application 135 may perform a mathematical computation on the value of the fetched data field and display the results of the mathematical computation in the user interface of the client application 135.

In an operation 460, the client application 135 may cause a value of the data field processed in operation 455 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 445 and 450 according to the results of the processing of the fetched value of the data field in operation 455.

4.2 Using Access Patterns to Suggest or Sort Objects

A client application 135 may traverse an offline object graph, e.g., in memory or stored on the client device 130, to determine object relationships based on a user's prior access patterns, a current location, a current time, a current application context, and/or current application operations. The object graph may include persistence entities 210 that each represent an object in the object graph. The user's prior access patterns may be recorded along with a time, location, application context, and/or application operations associated with access to objects.

In an embodiment, a system (e.g., client application 135) may select links to a particular subset of objects, from a set of objects, based on a likelihood of access by a user at a current time, location, and/or application context. The links to the set of objects (or the objects themselves) may be presented, for example, under a favorites tab or a suggestions tab. The system may order objects in a presented set of objects based on a likelihood of access by a user. The list of objects may be continually modified or sorted based on current conditions.

In an embodiment, a system determines a likelihood of access to an object based on prior access patterns, conditions associated with prior access patterns, and current conditions. If the system detects a pattern of accessing an object x whenever a particular condition has occurred, then the system identifies and stores an association between the particular condition and the object x. The particular condition may include a time, location, application operation, and/or application context associated with the access to the object x. The likelihood of access to the object x based on a particular condition is computed in proportion to a correlation between (a) a detected access pattern for object x and (b) the particular condition.

Figure 5:
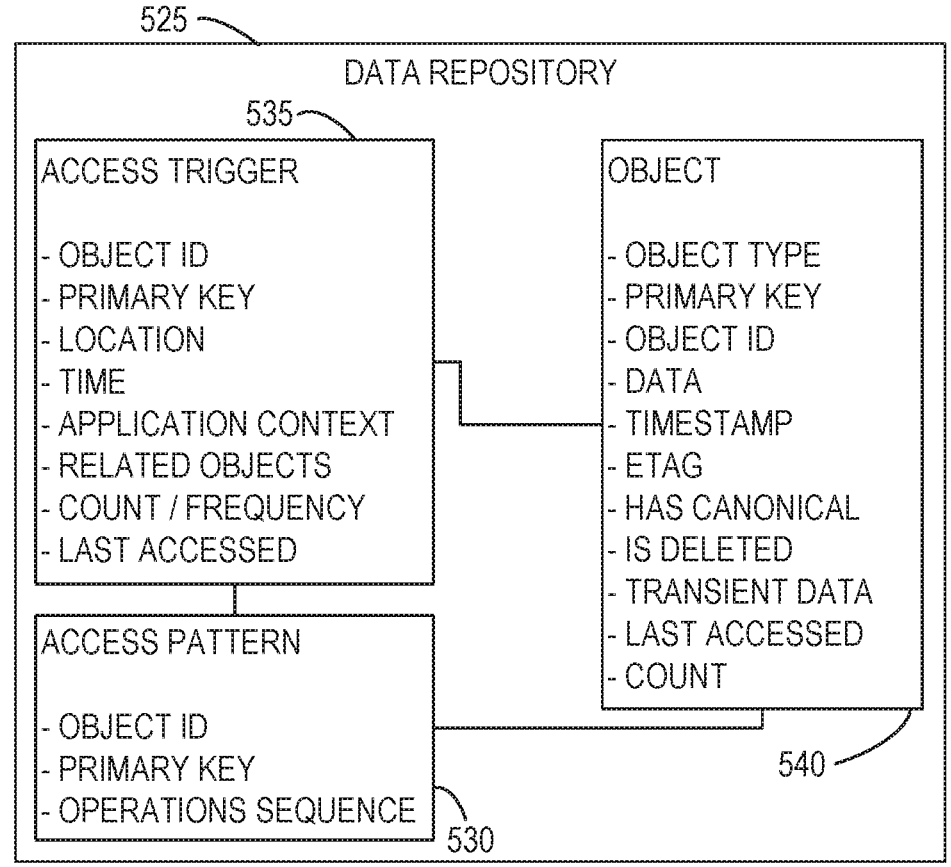
FIG. 5 shows a block diagram that illustrates components of a system for using access patterns to suggest or sort objects in accordance with one or more embodiments.
Figure 5:
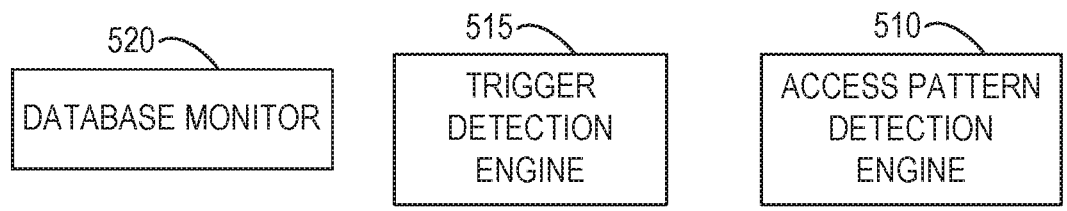
Figure 5:
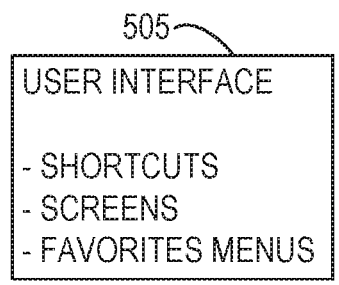

FIG. 5 shows a block diagram that illustrates components of a system 500 for using access patterns 530 to suggest or sort objects 540 in accordance with one or more embodiments. The system 500 may include an embodiment of the client application 135. The system 500 may include a user interface 505, an access pattern detection engine 510, a trigger detection engine 515, a database monitor 520, and a data repository 525. The data repository 525 may store the access patterns 530 and the objects 540, e.g., on the client device 130. In various embodiments, the system 500 may include more or fewer elements, and features of any of the elements disclosed herein with respect to the system 500 may be included in one or more other elements of the system 500 in addition to or instead of the elements disclosed in association with the features.

The user interface 505 may facilitate interaction between the system 500 and a user. The user interface 505 may include various user interface elements, e.g., screens, shortcuts, and favorites menus. An icon or a link may also be considered a shortcut as discussed herein. The user interface 505 may provide the shortcuts to access various objects 540 instead of traversing standard user interface paths to reach the various objects 540. The various objects 540 accessible via the shortcuts may be accessed with less difficulty than via traversal of the standard user interface paths. Less difficulty in accessing the objects 540 may be determined according to fewer screens than are traversed in the standard user interface path. Less difficulty may be determined according to fewer user interface operations than are performed in the standard user interface path to access the objects 540. Less difficulty may be determined according to less time elapsed than is required in the standard user interface path to access the objects 540. Less difficulty may also be determined according to a more convenient or efficient type of communication interface or network connection via which the objects 540 are accessed.

The shortcuts may be provided in one or more favorites menus. The favorites menus may supplement standard user interface menus by providing the shortcuts to the various objects 540. Selecting a shortcut in a favorites menu may select an associated object 540 with less difficulty than a standard user interface path to select the associated object 540. The shortcuts may also be provided on various screens of the user interface. A shortcut may also open an associated screen with less difficulty than a standard user interface path to reach the associated screen. A given object 540 associated with the shortcut may be accessed via the screen associated with the shortcut.

The access pattern detection engine 510 may monitor the user interface 505 and the data repository 525 to detect patterns of accessing the objects 540 using the user interface 505. The access pattern detection engine 510 may create and store one or more access patterns 530 in association with each object 540 according to the detected patterns of accessing the objects 540. The access pattern detection engine 510 may include a machine learning module that identifies patterns of accessing the objects 540 that are frequently performed or associated with various notable conditions. The access pattern detection engine 510 may store each identified pattern of accessing each object 540 in a separate access pattern 530 including a sequence of operations performed in the user interface 505 to access the associated object 540. The access pattern detection engine 510 may store the local object ID that the system 500 uses to uniquely identify the associated object 540 in the access pattern 530. The access pattern detection engine 510 may also store a primary key associated with the version of the object 540 stored in a datastore 115 on a server 110.

In an embodiment, the access pattern detection engine 510 also determines conditions associated with the access patterns 530 in accessing the objects 540. The access pattern detection engine 510 may determine that a particular condition is associated with an access pattern 530 by monitoring a number of times or a frequency with which the particular condition is present when a particular object 540 is accessed via a particular access pattern 530. When the number of times or the frequency exceeds a threshold value, the access pattern detection engine 510 may determine that the particular condition is associated with the particular access pattern 530 and the particular object 540. As an example, if the access pattern detection engine 510 determines that a particular condition is present eight out of ten times when an object 540 is accessed, the access pattern detection engine 510 may determine that the particular condition is associated with an access pattern 530 for the object 540. The higher the frequency with which a particular condition is present when the object 540 is accessed, the higher the correlation between the particular condition and the access pattern for the object 540.

The access pattern detection engine 510 may create and store one or more access triggers 535 in association with each object 540 and each access pattern 530 according to the particular conditions associated with each of the access patterns 530 accessing the associated objects 540. The access pattern detection engine 510 may include a machine learning module that identifies frequent or notable conditions associated with each of the identified patterns of accessing the objects 540. The access pattern detection engine 510 may store each identified condition associated with each of the access patterns 530 accessing the associated objects 540 in an access trigger 535 along with associated information. The access trigger 535 may store the local object ID that the system 500 uses to uniquely identify the object 540 accessed via the associated access pattern 530. The access trigger 535 may also store a primary key associated with the version of the object 540 stored in a datastore 115 on a server 110. A type of the condition and information regarding the condition may be stored in the access trigger 535.

The access pattern detection engine 510 may detect the patterns of accessing an object 540, determine current conditions associated with the access patterns 530 in accessing the object 540, and create and store the access triggers 535 in association with the object 540 without giving consideration to or accessing a type of the object 540. The access pattern detection engine 510 may be object-agnostic in that regardless of the type of object 540 that a current condition applies to, or that an access pattern applies to, the access pattern detection engine 510 may create and store an access pattern 530 and an access trigger 535 in association therewith.

As an example, a salesman typically sells widget K to a client, Big C. The salesman completes the sale when visiting the client at the client's office. In order to complete the sale, the salesman navigates through a product catalog, on a client application 135 executing on a client device 130, to find the widget K in the product catalog. The salesman then selects widget K in the product catalog, to navigate to an interface object associated with widget K where the salesman can place an order for widget K. The salesman may navigate to the interface object associated with widget K prior to travelling to Big C's office, in order to have the client application 135 at the correct interface object in advance of meeting the client. The salesman may open the client application 135 after meeting the client contact at Big C's office and confirming the order. Accordingly, the salesman may navigate to the interface object associated with widget K, prior to or subsequent to, travelling to Big C's office. The trigger detection engine 515 identifies the repeated usage of the interface object associated with widget K while at Big C's office location and/or prior to going to Big C's office location. The access pattern detection engine 510 identifies an association between the salesman's client device 135 being located at Big C's office location (location-based condition) and access to the interface object associated with widget K (access pattern).

In another example, at approximately 6:00 pm each day, a salesperson reviews the sales for the day. The salesman reviews the sales for the day using a client application 135 on a client device 130. The salesman first navigates to a reports tab and executes a search for a "sales report." The salesman then navigates the search results to find the sales report labeled a "Daily Sales Report." The salesman executes the "Daily Sales Report" to obtain a list of sales for the day. Based on the access pattern and the time of access, the access pattern detection engine 510 may identify an association between access to the "Daily Sales Report" (access pattern) and a time period from 5:30 pm to 6:30 pm (time-based condition).

In another example, a doctor uses a client application 135 to access patient records. The doctor typically reviews a patient's medical history prior to reviewing the patient's current medical condition. Based on the doctor's review habits, the access pattern detection engine 510 may identify an association between access to a patient's current medical condition (access pattern) and a patient's medical history (operation-based condition). The access pattern detection engine 510 determines that subsequent to reviewing a patient's medical history, the doctor will likely review the patient's current medical condition.

The trigger detection engine 515 may monitor the client device 130, the system 500, the user interface 505, and/or the data repository 525 to detect a particular condition specified by an instance of the access trigger 535. When the particular condition is detected as being present, the trigger detection engine 515 may cause the user interface 505 to improve accessibility for the object 540 associated with the access trigger 535. In some embodiments, accessibility may be improved when difficulty of accessing the object 540 is determined to exceed a threshold under normal conditions. For example, if a number of user interface actions or an amount of time required to access the object 540 normally exceeds a threshold and the particular condition is detected as being present, then accessibility for the object 540 may be improved to reduce the number of user interface actions and/or amount of time required to access the object 540. The improvement in accessibility for the object 540 may be temporary. For example, the improvement in accessibility may be for as long as the particular condition is detected as being present. The system 500 may dynamically update the user interface 505 according to the trigger detection engine 515's ongoing detections of the particular condition and corresponding changes to accessibility of the object 540.

Improving the accessibility for the object 540 associated with the access trigger 535 may include presenting the object 540 or a link to the object 540 associated with the access trigger 535. The trigger detection engine 515 may cause the user interface 505 may present the object 540 or a link to the object 540 associated with the access trigger 535 prior to receiving instructions to present the object 540 or a link to the object 540 associated with the access trigger 535, e.g., from a user of the system 500. Improving the accessibility for the object 540 associated with the access trigger 535 may include presenting the object 540 or a link to the object 540 associated with the access trigger 535 more prominently than normal or more prominently than another object 540. Presenting the link to the object 540 associated with the access trigger 535 more prominently than normal may include presenting the link to the object 540 associated with the access trigger 535 in a more prominent position than a link to a second object 540 that would otherwise be presented in a more prominent position when the particular conditions specified by the instance of the access trigger 535 are not detected. Improving the accessibility for the object 540 associated with the access trigger 535 may include presenting the object 540 or a link to the object 540 associated with the access trigger 535 prior to receiving instructions to present the object 540 or a link to the object 540 associated with the access trigger 535. Improving the accessibility for the object 540 associated with the access trigger 535 may include executing commands, without user input, to traverse the user interface 505 to a screen associated with the object 540 that is associated with the access trigger 535. Improving the accessibility for the object 540 associated with the access trigger 535 may include establishing a communication path or a network connection to access the object 540 prior to a user initiating access to the object 540.

A location that the client device 130 on which the system 500 operates may be identified as a location-based condition, and information regarding the location may be stored in the access trigger 535. The location information may include GPS coordinates, a physical street address, or other information usable by the system 500 to identify a physical location. The trigger detection engine 515 may monitor a location of the client device 130 to detect a location-based condition. The trigger detection engine 515 may determine that the location-based condition has been met, when a current location of the client device 130 matches the location specified by the location-based condition stored in the access trigger 535. The trigger detection engine 515 may determine that the location-based condition has been met, when a current location of the client device 130 is within a threshold distance from the location specified by the location-based condition stored in the access trigger 535. The threshold distance may be 1 meter, 10 meters, 100 meters, 1 km, or some other distance as specified by a user preference.

As an example, the trigger detection engine 515 may determine that the client device 130 is located at Big C's office, a location specified by a location-based condition stored in the access trigger 535. Responsive to detecting the location-based condition, the system 500 may improve the accessibility for the object 540 associated with the access trigger 535. Improving the accessibility may include providing quick access to the object 540 associated with the location-based condition. An interface object, corresponding to widget K, may be associated with Big C's office location. The system 500 may present a link to the interface object corresponding to widget K. The link may be presented in a favorites menu or a suggestions menu to the interface object associated with widget K. The system 500 may present a pop-up interface element including the link so that the user may easily navigate to the interface object associated with widget K.

A time of day or time range may be identified as a time-based condition, and information regarding the time may be stored in the access trigger 535. The time information may include a time of day, a calendar day, a range of days, an hour, a time span during a day, or any combination thereof and repetition of a time of day and calendar day or span of days. The trigger detection engine 515 may monitor a current time of the client device 130 to detect a time-based condition. The trigger detection engine 515 may determine that the time-based condition has been met, when a current time of the client device 130 matches the time (or is within a time period) specified by the time-based condition stored in the access trigger 535. Responsive to detecting the time-based condition, the system 500 may improve the accessibility for the object 540 associated with the access trigger 535. Improving the accessibility may include providing quick access to the object 540 associated with the time-based condition.

As an example, the trigger detection engine 515 may determine that a current time is 5:30 pm, within a 5:30 pm to 6:30 pm time period specified by a time-based condition stored in the access trigger 535. Responsive to determining that the time-based condition has been met, the system 500 may improve the accessibility for the object 540 associated with the access trigger 535. Improving the accessibility may include presenting a link to the associated object 540, a "Daily Sales Report."

An application operation for the system 500 and/or any other application operating on the client device 130 simultaneously with the system 500, e.g., a calendar application, may be identified as an operation-based condition. Information regarding the application operation may be stored in the access trigger 535. The trigger detection engine 515 may monitor the operations performed by the application. The trigger detection engine 515 may determine that the operation-based condition has been met, when the trigger detection engine 515 detects an operation or sequence of operations specified by the operation-based condition. Responsive to detecting the operation-based condition, the system 500 may improve the accessibility for the object 540 associated with the access trigger 535. Improving the accessibility may include providing quick access to the object 540 associated with the operation-based condition.

As an example, the trigger detection engine 515 may determine that a doctor has accessed a patient's medical history, an operation that is specified by an operation-based condition stored in an access trigger 535. Responsive to determining that the operation-based condition has been met, the system 500 may present a link to the associated object 540, the current medical conditions for the same patient whose medical history is being reviewed by the doctor.

An application context for the system 500 and/or any other application operating on the client device 130 simultaneously with the system 500, e.g., a calendar application, may be identified as a context-based condition. Information regarding the application context may be stored in the access trigger 535. The trigger detection engine 515 may monitor the context of one or more applications executing on the client device 130. The trigger detection engine 515 may determine that the context-based condition has been met, when the trigger detection engine 515 detects an application context specified by the context-based condition. Responsive to detecting the context-based condition, the system 500 may improve the accessibility for the object 540 associated with the access trigger 535. Improving the accessibility may include providing quick access to the object 540 associated with the context-based condition. For example, the application context may include a scheduled appointment in a calendar application, or an operating mode of an application, e.g., the system 500.

Other objects 540 that are accessed in the system 500 may be identified as the condition, and information regarding the other objects 540 may be stored in the access trigger 535 as related objects. The related objects may include any objects 540 that are typically accessed shortly before or in association with the object 540 that the access trigger 535 identifies to provide access to via the associated access pattern 530. For example, in a medical patient database, an access pattern 530 associated with access to a medical chart object 540 corresponding to a medical patient may be triggered by access to a medical appointment record object 540 corresponding to the medical patient.

The access trigger 535 may also store a timestamp for the last time that the access trigger 535 was identified in association with access to the identified object 540 via the associated access pattern 530. The access trigger 535 may also store a count of the number of times or a frequency of times over a given time period that the access trigger 535 was identified in association with access to the identified object 540 via the associated access pattern 530.

The client application 135 may store a data repository 525 on the client device 130 to store the access patterns 530 and associated access triggers 535. The access patterns 530 and associated access triggers 535 may be associated with the objects 540 accessed according to the access patterns 530 and/or the access triggers 535. There may be any number of access patterns 530 and access triggers 535 associated with a single object 540. The objects 540 may be embodiments of the persistence entities 210.

Each instance of the object 540 may include a specification of the object type, e.g., according to the corresponding object type definition 220. The object 540 may also include a primary key that identifies the corresponding object stored in the datastore 115 on the server 110. The object 540 may also include a unique object ID to uniquely identify the object 540 within the local data repository 525. The object 540 may include data as specified by the corresponding object type definition 220. The object 540 may include a timestamp that specifies when the object 540 was created, last updated, and/or last accessed. The object 540 may include an ETAG that specifies whether the object 540 has been updated since the object 540 was last synchronized with the datastore 115. The object 540 may indicate whether the instance of the object 540 is a full canonical representation of the corresponding object stored in the datastore 115. The object 540 may indicate whether the object 540 is to be deleted and the corresponding object stored in the datastore 115 is to be deleted the next time the data repository 525 synchronizes with the datastore 115. The object 540 may indicate a number of times and/or a frequency with which the object 540 has been accessed.

Figure 6:
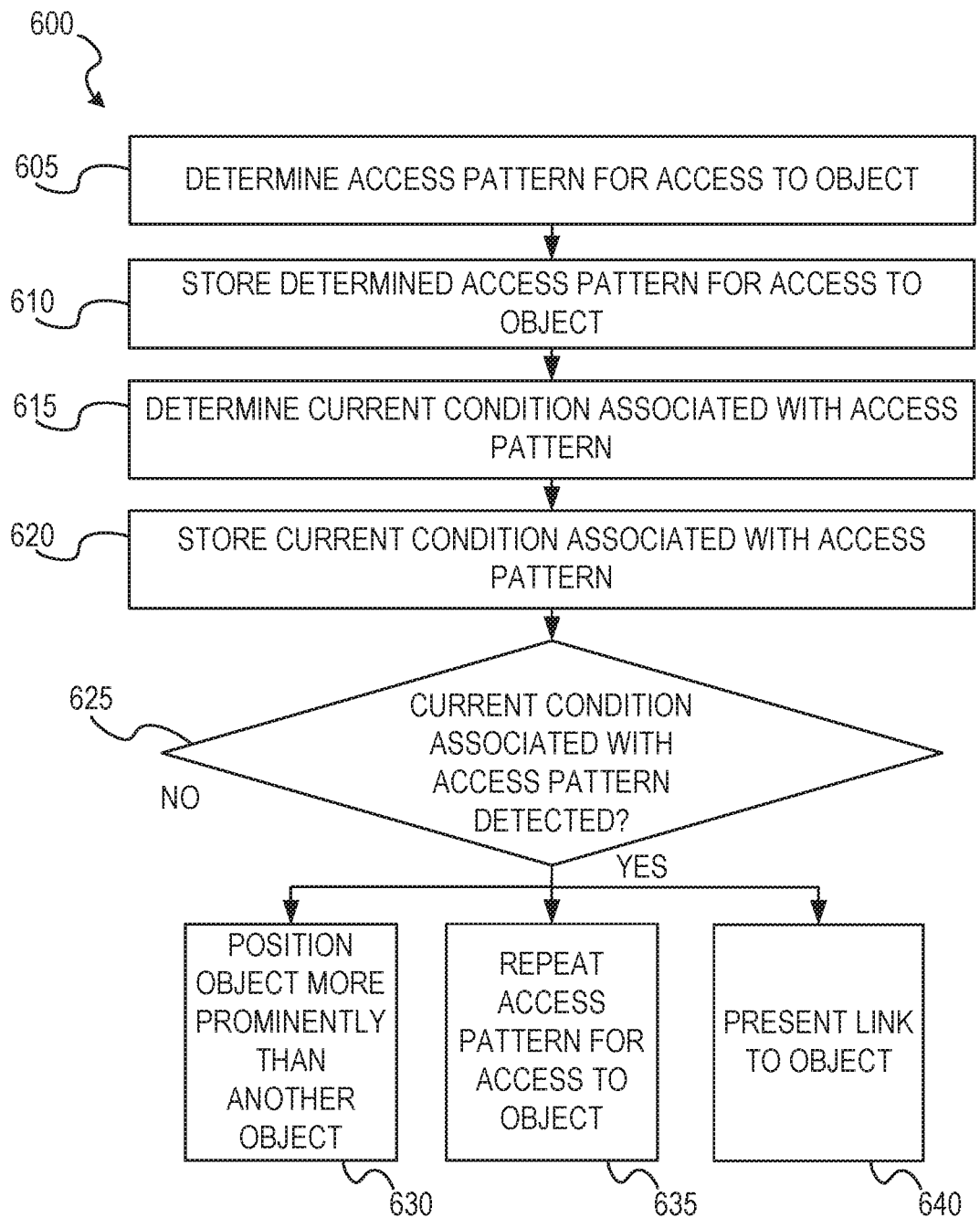
FIG. 6 shows a block diagram that illustrates an example set of operations for using access patterns to suggest or sort objects in accordance with one or more embodiments.

FIG. 6 shows a block diagram that illustrates an example set of operations 600 for using access patterns to suggest or sort objects in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an operation 605, the access pattern detection engine 510 may determine an access pattern for access to an object 540. For example, the access pattern detection engine 510 may monitor the user interface 505 and the data repository 525 to determine the access pattern for access to the object 540 using the user interface 505.

For example, over a period of time, the access pattern detection engine 510 may recognize that a user accesses an object 540, e.g., a client record for customer C, numerous times in association with a particular current condition. The access pattern detection engine 510 may recognize that the user frequently accesses the client record for customer C when the client device 130 is physically located within a threshold distance from customer C's place of business. The access pattern detection engine 510 may recognize that the user frequently accesses the client record for customer C when the user has an appointment scheduled with customer C in a calendar application on the client device 130 within a threshold period of time from the present time of accessing the client record of customer C. The access pattern detection engine 510 may recognize that the user frequently accesses the client record for customer C when the user receives or attempts to place a telephone call to customer C on a telephone application on the client device 130 at a time proximate the present time of accessing the client record for customer C. The access pattern detection engine 510 may recognize that the user frequently accesses the client record for customer C just after another user action in the system 500, e.g., checking an inventory of a product P. When the number of times that the user accesses the object 540 in association with the particular current condition exceeds a preset threshold value, the access pattern detection engine 510 may determine the access pattern of accessing the object 540 to be a candidate for storing.

In an operation 610, the access pattern detection engine 510 may store the determined access pattern for access to the object 540 as a stored access pattern 530. The access pattern detection engine 510 may store a sequence of operations performed by the user interface 505 to access the object 540. The access pattern detection engine 510 may create and store an access pattern 530 in association with the accessed object 540 according to the detected pattern of accessing the object 540. The stored access pattern 530 may include the sequence of operations performed in the user interface 505 to access the associated object 540. Continuing the example, the access pattern detection engine 510 may store the sequence of operations performed by the user in the user interface 505 to access the client record for customer C in the stored access pattern 530.

In an operation 615, the access pattern detection engine 510 may determine a current condition associated with the stored access pattern 530. In an embodiment, the access pattern detection engine 510 may determine that the current condition is associated with the stored access pattern 530 by monitoring a number of times or a frequency with which the current condition is present when the object 540 is accessed via the stored access pattern 530. When the number of times or the frequency exceeds a threshold value, the access pattern detection engine 510 may determine that the current condition is associated with the stored access pattern 530 and the object 540. Continuing the example, if the access pattern detection engine 510 determines that the client record for the customer C is accessed more than a threshold number of times or greater than a threshold frequency after an inventory of a product P is checked, the access pattern detection engine 510 may determine that the user action of checking the inventory of the product P is a user action that is a current condition associated with access to the client record for customer C.

In an operation 620, the access pattern detection engine 510 may store the current condition associated with the stored access pattern 530 in the access trigger 535. A type of the current condition and information regarding the current condition may be stored in the access trigger 535. The stored access trigger 535 may include the particular current condition associated with the determined access pattern, e.g., the location, time, application context, and/or related objects associated with the accessed object 540. The stored access trigger 535 may also include the number of times and/or the frequency the object 540 was accessed according to the particular condition, and the last time the object 540 was accessed according to the particular condition. Continuing the example, the access pattern detection engine 510 may store the particular current condition associated with accessing the client record for customer C in the stored access trigger 535.

In an operation 625, the trigger detection engine 515 may monitor the client device 130, system 500, the user interface 505, and/or the data repository 525 to determine whether a particular condition specified by an instance of the access trigger 535 associated with a stored access pattern 530 is detected. When no particular condition is detected, the trigger detection engine 515 may continue monitoring.

When a particular condition is detected, accessibility to an object 540 associated with the detected current condition may be improved, for example, according to one or more of operations 630, 635, or 640. Continuing the example, the trigger detection engine 515 may monitor the client device 130 to determine when the client device 130 comes near to the customer C's place of business, or may monitor a calendar application on the client device 130 to determine whether a meeting with the customer C is about to occur, or may monitor a telephone application on the client device 130 to determine whether a telephone call is in process or has recently been completed with the customer C, etc.

In an operation 630, the system 500 may position an object 540 associated with the detected current condition specified by the instance of the access trigger 535 more prominently than another object 540 that is not associated with the detected current condition. For example, if both objects 540 are in a list of objects 540, the object 540 that is associated with the detected current condition may be presented higher in the list of objects 540 than the objects 540 that are not. As another example where the objects 540 are presented as icons, the object 540 that is associated with the detected current condition may be presented as a larger icon than an object 540 that is not. The operation 630 may facilitate improved accessibility of the object 540 by making the object 540 that is most likely desired to be accessed more prominent when the current condition specified by the instance of the access trigger 535 is detected. Continuing the example above, when the client device 130 is near the customer C's place of business, the customer C may be placed higher on a list of customers than a customer A. Otherwise, the customer C may be placed in a normal position in the list of customers, e.g., according to alphabetical order.

In an operation 635, the system 500 may repeat a stored access pattern 530 to access the object 540 associated with the detected current condition specified by the instance of the access trigger 535 to access the object 540. User interface commands of the stored access pattern 530 may be repeated prior to receiving an instruction to access the object 540. Commands of the stored access pattern 530 may be repeated without receiving a user input to perform the individual access functions included in the stored access pattern 530. For example, user interface commands may be executed without user input to traverse the user interface to a screen associated with the object 540 according to the stored access pattern 530. The operation 635 may facilitate improved accessibility of the object 540 by reducing the user input required to access the object 540 when the current condition specified by the instance of the access trigger 535 is detected. Continuing the above example, when a call from customer C is received by the client device 130, the stored access pattern 530 for accessing the object 540 associated with the customer C may be repeated to access the client record for customer C without specific additional input from the user. In this way, the user may have ready access to the client record for customer C while on the call with customer C.

In an operation 640, the system 500 may present a link to the object 540 in the user interface 505. Whereas, ordinarily, the object 540 may only be accessible via a stored access pattern 530 that involves numerous user interface actions, the link to the object 540 presented in the operation 640 may facilitate improved accessibility of the object 540 by bypassing the normal process of accessing the object 540 and permitting direct access to the object 540 via the presented link when the current condition specified by the instance of the access trigger 535 is detected. Continuing the example above, when a calendar application on the client device 130 indicates that an appointment with the customer C is scheduled, a link to the client record for the customer C may be placed on a favorites menu of the system 500. Otherwise, the link to the client record for the customer C may not be present in the favorites menu.

Figure 7:
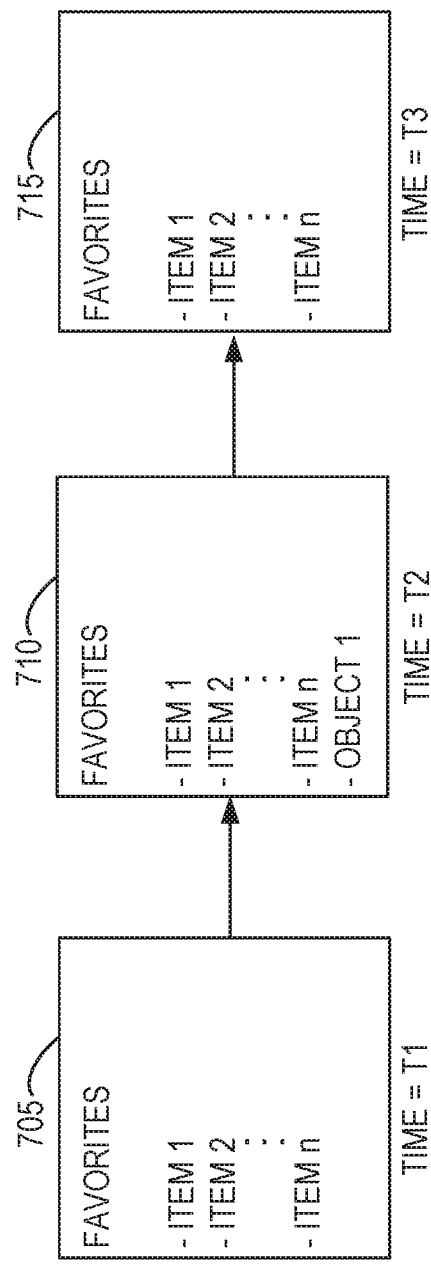
FIG. 7 shows a block diagram that illustrates an example of using access patterns to suggest or sort objects in accordance with one or more embodiments.

FIG. 7 shows a block diagram that illustrates an example of using access patterns to suggest or sort objects in accordance with one or more embodiments. For example, FIG. 7 may represent an embodiment of operation 640 in a system 500 operating on a client device 130 as described above with reference to FIG. 6.

At an initial time T1, a window 705 of the system 500 shows a favorites list or a bookmarks list that includes items 1 through n. The initial time T1 may be a time during normal operation before a user has a meeting or a telephone call scheduled with a customer C, for example.

After a series of user operations and/or passage of time, the trigger detection engine 515 detects a current condition that matches an access trigger 535 at a time T2. Continuing the example of FIG. 6, the current condition may be that a time has come for a meeting with the customer C. At that time T2, the system 500 may add a link to an object 540 associated with the access trigger 535 corresponding to the current condition, object 1, to the favorites list in the updated window 710. The object 1 may be added to the favorites list before any instructions are received from a user or from a script to add the object 1 to the favorites list. In some embodiments, the object 1 may be added to the favorites list in a position above other existing items already present in the favorites list. The object 1 may remain in the updated window 710 for as long as the current condition persists. Continuing the example, the object 1 may be a link to the client record for the customer C. The link to the client record for customer C may be present in the favorites list window 705 for the duration of the scheduled meeting with the customer C.

After the current condition ceases, which in general may be after a period of time and/or after a number of user operations, the system 500 may remove the object 1 from the favorites list in an updated window 715. Continuing the current example, after the scheduled meeting with the customer C concludes, the link to the client record for the customer C represented by the object 1 may be removed from the favorites list in the updated window 715.

Figure 8:
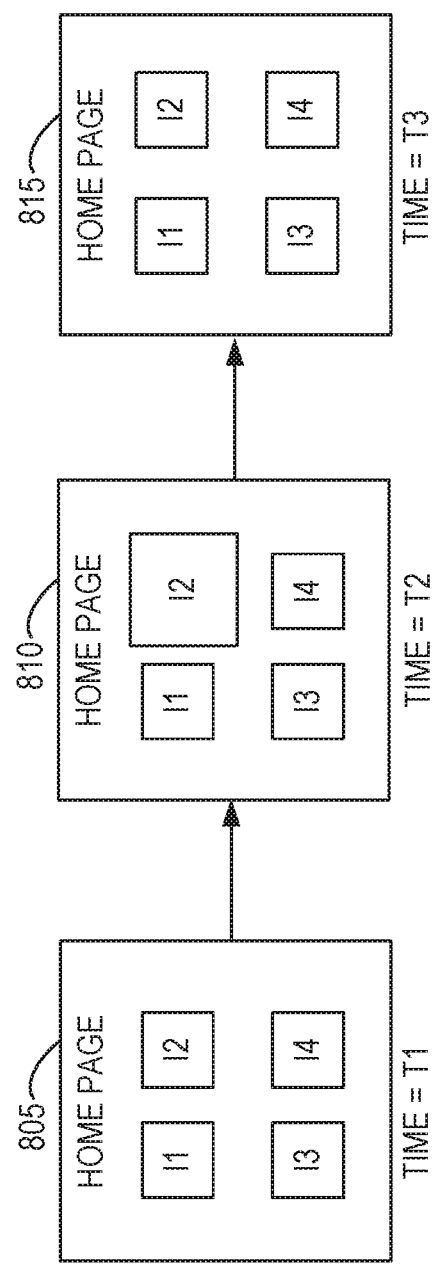
FIG. 8 shows a block diagram that illustrates an example of using access patterns to suggest or sort objects in accordance with one or more embodiments.

FIG. 8 shows a block diagram that illustrates an example of using access patterns to suggest or sort objects in accordance with one or more embodiments. For example, FIG. 8 may represent an embodiment of operation 630 in a system 500 operating on a client device 130 as described above with reference to FIG. 6.

At an initial time T1, a home page 805 of a system 500 shows a number of icons including I1, I2, I3, and I4. The initial time T1 may be a time during normal operation before a user has a meeting or a telephone call scheduled with a customer C, for example. The icon I2 may be a link to the client record for the customer C, and the icons I1, I3, and I4 may be links to other client records of other customers.

After a series of user operations and/or passage of time, the trigger detection engine 515 detects a current condition that matches an access trigger 535 at a time T2. Continuing the example of FIG. 6, the current condition may be that a time has come for a meeting with the customer C. At that time T2, the system 500 may enhance the accessibility of the object 540 associated with the icon I2 by enlarging the icon I2 in an updated home page 810 when the object 540 is associated with the access trigger 535 corresponding to the current condition. The icon I2 may remain enlarged for as long as the current condition persists. Continuing the example, the icon I2, which is a link to the client record for the customer C, may remain enlarged for the duration of the scheduled meeting with the customer C.

After the current condition ceases, which in general may be after a period of time and/or after a number of user operations, the system 500 may return the size of the icon I2 to the standard size for the icon I2 in the updated home page 815. Continuing the current example, after the scheduled meeting with the customer C concludes, the icon I2 representing the link to the client record for the customer C may return to normal size in the updated home page 815.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between the overlay nodes as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into the remote computer's dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as the code is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

detecting an access pattern for accessing a first object accessible via a user interface;

determining a set of one or more conditions associated with the access pattern for accessing the first object;

configuring detection of the set of one or more conditions as a trigger for improving accessibility for the first object within the user interface; and responsive to detecting the set of one or more conditions, improving the accessibility for the first object within the user interface by presenting the first object within the user interface prior to receiving instructions to present the first object.

2. The medium of claim 1, wherein improving the accessibility for the first object within the user interface comprises presenting a link to the first object.

3. The medium of claim 2, wherein presenting the link to the first object comprises presenting the link to the first object in a more prominent position than a link to a second object that would otherwise be presented in a more prominent position when the set of one or more conditions is not detected.

4. The medium of claim 1, wherein improving the accessibility for the first object within the user interface comprises presenting the first object more prominently than a second object within the user interface.

5. The medium of claim 1, wherein improving the accessibility for the first object within the user interface comprises executing commands, without user input, to traverse the user interface to a screen associated with the first object.

6. The medium of claim 1, wherein determining the set of one or more conditions comprises determining that a particular user action within the user interface is typically detected prior to access to the first object by a user.

7. The medium of claim 1, wherein determining the set of one or more conditions comprises identifying a reoccurring time period during which an operation to access the first object is executed.

8. The medium of claim 1, wherein determining the set of one or more conditions comprises identifying a location of a device executing an operation to access the first object.

9. The medium of claim 1, wherein determining the set of one or more conditions comprises identifying an appointment in a calendar application corresponding to a time period during which an operation to access the first object is executed.

10. The medium of claim 1, wherein the detecting, determining, and configuring operations are executed without accessing a type of the first object.

11. The medium of claim 1, wherein improving the accessibility for the first object within the user interface comprises repeating the access pattern for access to the first object.

12. The medium of claim 11, wherein the access pattern for access to the first object is repeated prior to receiving instructions to repeat the access pattern.

13. The medium of claim 11, wherein repeating the access pattern for access to the first object comprises executing multiple user interface actions without receiving separate user input for each of the multiple user interface actions.

14. The medium of claim 1, wherein detecting an access pattern comprises identifying a sequence of user interface operations performed to access the first object.

15. A non-transitory computer readable medium comprising instructions which, when executed by one or more hardware processors, causes performance of operations comprising:

detecting an access pattern for accessing a first object accessible via a user interface and storing a sequence of user interface operations performed to access the first object;

determining a set of one or more conditions associated with the access pattern for accessing the first object, wherein the set of one or more conditions includes at least one of:

determining that a particular user action within the user interface is typically detected prior to access to the first object by a user;

identifying a reoccurring time period during which an operation to access the first object is executed;

identifying a location of a device executing an operation to access the first object; or identifying an appointment in a calendar application corresponding to a time period during which an operation to access the first object is executed;

configuring detection of the set of one or more conditions as a trigger for improving accessibility for the first object within the user interface; and responsive to detecting the set of one or more conditions, presenting the first object within the user interface prior to receiving user instructions to present the first object, in a more prominent position than a second object that would otherwise be presented in a more prominent position when the set of one or more conditions is not detected.

16. The medium of claim 15, wherein improving the accessibility for the first object includes reducing a number of user interface operations to be performed responsive to a user input to access the first object.

17. A non-transitory computer readable medium comprising instructions which, when executed by one or more hardware processors, causes performance of operations comprising:

detecting an access pattern for accessing a first object accessible via a user interface and storing a sequence of user interface operations performed to access the first object;

determining a set of one or more conditions associated with the access pattern for accessing the first object, wherein the set of one or more conditions includes at least one of:

determining that a particular user action within the user interface is typically detected prior to access to the first object by a user;

identifying a reoccurring time period during which an operation to access the first object is executed;

identifying a location of a device executing an operation to access the first object; or identifying an appointment in a calendar application corresponding to a time period during which an operation to access the first object is executed;

configuring detection of the set of one or more conditions as a trigger for improving accessibility for the first object within the user interface; and responsive to detecting the set of one or more conditions, executing commands, without user input, to traverse the user interface to a screen associated with the first object.

18. The medium of claim 17, wherein the particular user action within the user interface detected prior to access to the first object by a user includes access to a second object by the user.

19. The medium of claim 4, wherein:
the first object is a first icon having a first size;

the second object is a second icon have a second size; and the first size of the first icon is larger than the second size of the second icon, the first icon thereby more prominently displayed than the second icon.

20. The medium of claim 4, wherein:

the first object is a first item in a list of objects;

the second object is a second item in the list of objects; and the first item is located higher in the list of objects than the second item, the first item thereby more prominently displayed than the second item.

21. The medium of claim 1, wherein detecting the set of one or more conditions comprises detecting a particular application context displayed in the user interface.

22. The medium of claim 1, wherein:

detecting the access pattern for accessing the first object comprises detecting the access pattern at a particular time; and detecting the set of one or more conditions comprises detected the particular time.

23. The medium of claim 1, wherein determining the set of one or more conditions associated with the access pattern comprises detecting the set of one or more conditions when the first object is accessed.

24. The medium of claim 1, wherein:

detecting the access pattern comprises detecting the access pattern in association within a particular time period; and detecting the set of one or more conditions comprises detecting that a current time corresponds to the particular time period.

\* \* \* \* \*